(12) United States Patent
St. John et al.

(10) Patent No.: US 6,317,595 B1
(45) Date of Patent: Nov. 13, 2001

(54) METHODS AND SYSTEM FOR TRANSFERRING CALLS WITHIN TRUNKED DIGITAL RADIO COMMUNICATIONS SYSTEMS

(75) Inventors: James T. St. John; William O. Janky, both of Goode, VA (US)

(73) Assignee: COM-NET Ericcson Critical Radio Systems, Inc., Lynchburg, VA (US)

( * ) Notice: Subject to any disclaimer, the term of this patent is extended or adjusted under 35 U.S.C. 154(b) by 0 days.

(21) Appl. No.: 09/092,161

(22) Filed: Jun. 5, 1998

(51) Int. Cl.⁷ .................................................. H04M 3/42
(52) U.S. Cl. .................. 455/417; 455/426; 455/450; 455/517; 379/215; 370/329
(58) Field of Search ......................... 455/426, 417, 455/416, 450, 517, 524, 560, 561; 370/261, 263, 329, 335, 371, 458; 379/202, 208–214, 215, 372, 373

(56) References Cited

U.S. PATENT DOCUMENTS

| | | | |
|---|---|---|---|
| 4,649,543 | * | 3/1987 | Levine ................................ 714/774 |
| 4,768,220 | * | 8/1988 | Yoshihara et al. .................... 455/516 |
| 5,008,953 | * | 4/1991 | Dahlin et al. ........................ 455/423 |
| 5,483,670 | | 1/1996 | Childress et al. .................... 455/34.1 |
| 5,513,251 | * | 4/1996 | Rochkind et al. ................. 379/93.35 |
| 5,768,262 | * | 6/1998 | Hallock ................................ 370/259 |
| 5,819,171 | * | 10/1998 | Hoogerwerf et al. ............... 455/410 |

* cited by examiner

*Primary Examiner*—Dwayne Bost
*Assistant Examiner*—Charles Craver
(74) *Attorney, Agent, or Firm*—James H. Beusse, Esq.; Enrique J. Mora, Esq.; Beusse, Brownlee, Bowdoin & Wolter, P.A.

(57) ABSTRACT

Calls are transferred from a first call to a second call in a trunked digital radio communications system that includes a first transmitting user terminal that communicates with a receiving user terminal or group of user terminals in the first call over a first working channel via a base station. A second call is transmitted from a second transmitting user terminal to the base station over a second working channel, that identifies the receiving terminal. Transfer data is transmitted from the base station to the receiving terminal or group of user terminals in the first call on the first working channel, the transfer data identifying the second call and the second working channel. The transfer data is detected in the first call on the first working channel at the receiving user terminal and the receiving user terminal transfers to the second call on the second working channel based upon the transfer data.

25 Claims, 4 Drawing Sheets

METHODS AND SYSTEM FOR TRANSFERRING CALLS WITHIN TRUNKED DIGITAL RADIO COMMUNICATIONS SYSTEMS

FIELD OF THE INVENTION

The present invention relates to the field of communications in general, and to radio communications in particular.

BACKGROUND OF THE INVENTION

A trunked digital radio communications system may be used to provide point to point radio communications between single users or groups of users. A user may access the trunked digital radio communications system by placing a call with a radio or user terminal and transferring voice or data information to another user terminal or group of user terminals. The information may be transferred between the user terminals on communications channels (working channels). The trunked digital radio communications system may provide multiple working channels to enable multiple users to share the trunked digital radio communications system. Free working channels may be assigned as calls are initiated within the trunked digital radio communications system. When a call is completed, the assigned working channel may be released and subsequently may be assigned to a new call.

In some trunked digital radio communications systems, a control channel may provide the working channel assignment for a particular call. For example, when a call is initiated, the working channel assignment for the call may be transmitted on the control channel. Consequently, user terminals within the trunked digital radio communications system may monitor the control channel.

A user terminal may have a user terminal identifier that identifies the user terminal within the trunked digital radio communications system. Similarly, multiple user terminals may be designated as part of a group with a corresponding group identifier. A call may, therefore, be placed to a particular user terminal or group of user terminals within the trunked digital radio communications system by indicating the proper identifier. For example, the user terminal may include a keypad to enter the user terminal identifier of the particular user terminal to be called. Alternately, the group identifier may be entered, thereby broadcasting the call to the group. A user may then initiate a call within the trunked digital radio communications system by pressing a push-to-talk (PTT) button on the user terminal. The call is then transmitted using the identifier entered by the user.

Some existing trunked digital radio communications systems may allow an on-going call between user terminals to be interrupted by a higher priority call that is transmitted to at least one of user terminals participating in the call. For example, a user terminal may include a priority switch so that the user can select the priority of the call. Subsequently, a call transmitted to a user terminal has the selected priority. Accordingly, when the high priority call is transmitted, the identified user terminal (or group of user terminals) is interrupted with the higher priority call.

When the identified user terminal (or group of user terminals) receives the interruption, the identified user terminal (or group of user terminals) switches or transfers to the higher priority call, wherein the higher priority call is transmitted on a different working channel. The user terminal typically returns to the control channel to receive the working channel assignment for the higher priority call and then transfers to the assigned working channel. However, by the time the user terminal transfers to the control channel, receives the assigned working channel, and transfers to the assigned working channel (such as in TDMA systems that use FDMA control channels), the higher priority call may have ended. Moreover, some control channels may not be synchronized to the assigned working channel, thereby possibly increasing the time to transfer to the higher priority call. In view of the above discussion, there exists a need for improved trunked digital radio communications systems.

SUMMARY OF THE INVENTION

In view of the above discussion, it is an object of the invention to provide improved trunked digital radio communications systems.

It is another object of the present invention to provide improved call transfer in trunked digital radio communications systems.

These and other objects of the present invention are provided by methods, user terminals, and base stations that allow a receiving user terminal to transfer out of a first call to a second higher priority call addressed to the user terminal using transfer data that is transmitted on a working channel. In particular, a user terminal may transfer from a first call on a first working channel to a second call on a second working channel by transmitting from the base station to the receiving user terminal transfer data in the first call on the first working channel, the transfer data identifying a second call and the second working channel. The receiving user terminal detects the transfer data in the first call on the first working channel and transfers to the second call on the second working channel based upon the transfer data.

The user terminal transfers to the second call on the second working channel by detecting that the second call from the transmitting user terminal on the second working channel is a higher priority call than the first call to the receiving user terminal. Transfer data is generated on the first working channel that identifies the second call and transmitted to the receiving user terminal within a control frame on the first working channel downlink, wherein the first working channel downlink links the base station to the receiving user terminal on the first working channel.

Improved reliability may be provided by comparing a first color code that corresponds to a higher priority call (the second call) to which the user terminal has been instructed to transfer and a second color code that corresponds to the call to which the user terminal actually transferred (the current call). Comparing the color codes may indicate that the current call is not the higher priority call to which the user terminal was instructed to transfer. For example, if the higher priority call ends and the working channel and the time slot originally assigned to the higher priority call are reassigned to a new call before the user terminal completes the transfer to the higher priority call, the user terminal may transfer to the new call, not the higher priority call. The color codes may thereby ensure that the user terminal transfers to the higher priority call.

The first color code is included within the verification data and identifies the current call within the trunked digital radio communications system. The second color code is included within the transfer data and identifies the second (higher priority) call within the trunked digital radio communications system. Comparing the first and second color code may allow the user terminal to verify that the higher priority call has not ended and that the transfer has been made to the correct call. According to the prior art, verification may not occur after the transfer from the first call to the higher priority call. The receiving user terminal of the prior art may, therefore, transfer to a call that was not intended for the receiving user terminal.

In one aspect, a user terminal that communicates with a trunked digital radio communications system includes a transceiver that receives calls from the base station on the first and second working channels. A detector, responsive to the transceiver, detects transfer data within a first call on the first working channel and a switcher, responsive to the detector, transfers to a second call on the second working channel based on the transfer data.

In another aspect, a base station within a trunked digital radio communications system includes a transceiver that relays a first call from the first transmitting user terminal to a receiving user terminal on a first working channel and receives a second call from a second transmitting user terminal on a second working channel, the first call including transfer data. A processor, responsive to the transceiver places the transfer data in the first call on the first working channel from the base station to the receiving user terminal.

The present invention may improve trunked digital radio communications systems by decreasing the transfer time in switching from an on-going call to a higher priority call, thereby allowing increased probability that the transfer completes before the higher priority call ends. In particular, the present invention transmits transfer data within the on-going call. The transfer data identifies a higher priority call by indicating the working channel and time slot assigned to the higher priority call. The receiving user terminal detects the transfer data and transfers to the higher priority call. When the transfer to the higher priority call is complete, the receiving user terminal verifies the accuracy of the transfer by comparing the color code of the current call to the color code of the higher priority call identified in the transfer data.

The present invention may also improve trunked digital radio communication in TDMA-based systems by synchronizing the time slots within the working channels, thereby allowing reduced time to transfer from the first call to the second call. For example, the first working channel may include timing information that corresponds to the timing of the assigned time slot in the assigned working channel. The user terminal may therefore determine the start time of the assigned time slot in the second channel and may transfer to the second working channel at the appropriate time.

In systems according to the prior art, user terminals may first transfer to the control channel to receive the working channel assignment for the higher priority call. The control channel, however, may not include synchronizing information with respect to the assigned working channel and may therefore increase the time to transfer to the higher priority call. The increased transfer time may increase the possibility that the higher priority call has ended by the time that the user terminal is able to synchronize to the assigned time slot in the assigned working channel.

The present invention may allow user terminals according to the prior art to function in a system utilizing the present invention, thereby allowing backward system compatibility. User terminals in the prior art may use a control channel to receive working channel and time slot assignments for call transfers. The present invention may provide the control channel to the prior art user terminals thereby allowing the prior art user terminals to communicate with user terminals according to the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is also described using a flow chart illustration. It will be understood that each block of the flowchart illustration, and combinations of blocks in the flowchart illustration, can be implemented by computer program instructions. These program instructions may be provided to a processor(s) within the satellite communications system and/or user terminal, such that the instructions which execute on the processor(s) create means for implementing the functions specified in the flowchart block or blocks. The computer program instructions may be executed by the processor(s) to cause a series of operational steps to be performed by the processor(s) to produce a computer implemented process such that the instructions which execute on the processor(s) provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 1A:
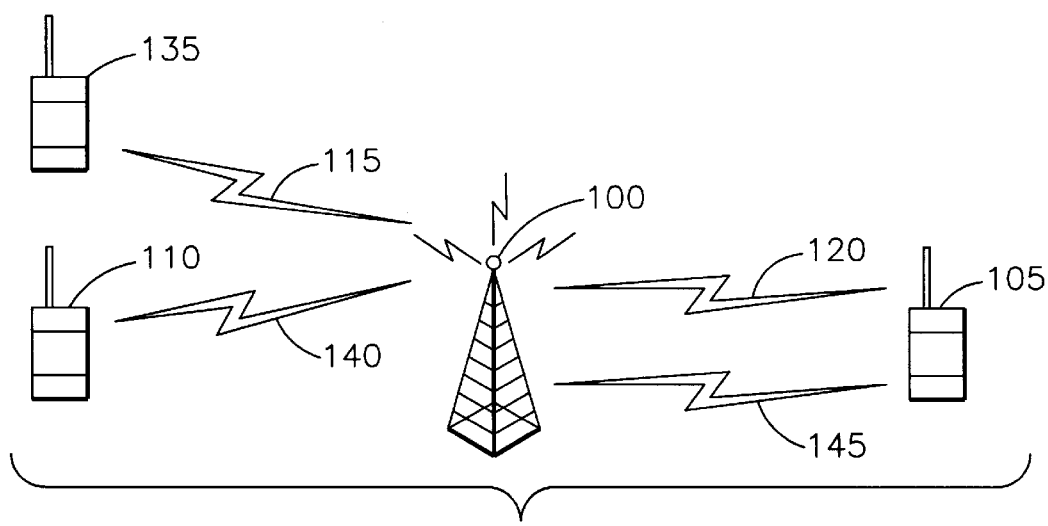
FIG. 1A illustrates a trunked digital radio communications system according to the present invention.

FIG. 1A illustrates a trunked digital radio communications system according to the present invention, wherein user terminals communicate via a plurality of working channels that can carry voice and/or data. A first transmitting user terminal 110 communicates with a receiving user terminal 105 by placing calls through a base station 100 (site) over the working channel 125. Similarly, a second transmitting user terminal 135 communicates with the receiving user terminal 105 by placing calls through the base station 100 over the working channel 130. The trunked digital radio communications systems can include a single site or multiple sites. The base station 100 relays the call from the transmitting user terminal to the receiving user terminal on the assigned working channel 125 or 130. The user terminals are uniquely identified within the trunked digital radio communications system by caller identifications. A group of user terminals may be identified by a caller identification to allow calls to be broadcast to the group. For example, a police dispatcher may broadcast to a group of officers located within a particular area and identified by a caller identification. Calls may be initiated using a button located on the user terminal that sends an indication to the trunked digital radio communications system that a particular user terminal is transmitting. For example, the user terminal may include a push-to-talk (PTT) button that initiates a call wherein the user pushes the PTT button while speaking into the user terminal.

A first user terminal calls a second user terminal by transmitting the caller identification corresponding to the second user terminal within the call. The second user terminal detects the caller identification on the assigned working channel. For example, the user terminal 110 (the transmitting user terminal) can call user terminal 105 by dialing the caller identification of user terminal 105 (the receiving user terminal) and transmitting the data. The base station 100 detects the transmission on working channel 125 and relays the call to the receiving user terminal 105. The user terminal 105 detects the caller identification within the call on working channel 125 and receives the transmitted data. The user terminal 105 can respond by placing a call to the user terminal 110 using the caller identification of user terminal 110. Similarly, the base station relays the call to the user terminal 110.

The working channel 125 includes a working channel uplink 115 that links the user terminal 110 to the base station 100 and a working channel downlink 120 that links the base station 100 to the user terminal 105. Accordingly, the user terminal 110 transmits the call to the base station 100 over the working channel uplink 115 and the user terminal 105 receives the call from the base station 100 over the working channel downlink 120. Similarly, the working channel 130 includes a working channel uplink 140 that links the user terminal 135 to the base station 100 and a working channel downlink 145 that links the base station to the user terminal 105. The user terminal 135 transmits the call to the base station 100 over the working channel uplink 140 and the user terminal 105 receives the call from the base station 100 over the working channel downlink 145.

Figure 1B:
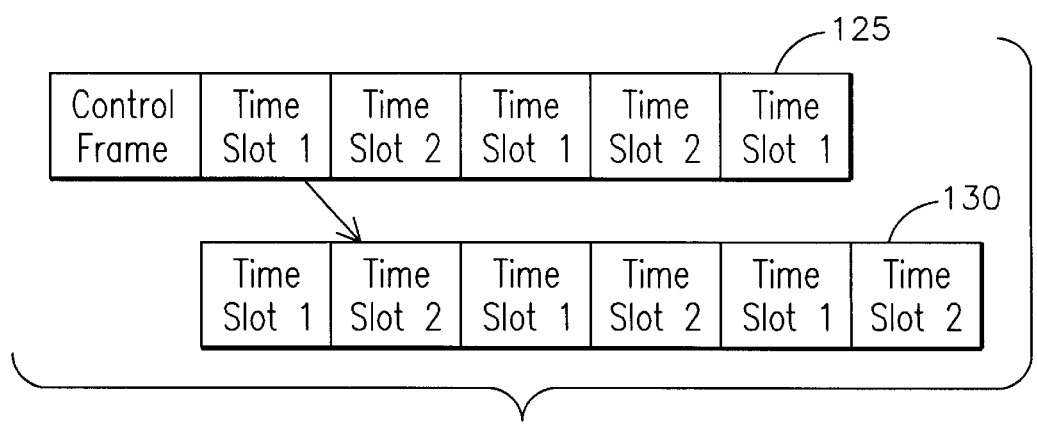
FIG. 1B illustrates a first and a second working channel according to the present invention.

FIG. 1B illustrates a first and a second working channel according to the present invention. The working channels 125 and 130 can be defined as a time slot and/or a frequency, or other techniques known in the art. In a preferred embodiment, the working channel is a time domain multiplex access (TDMA) channel defined by a frequency and a time slot. For example, the working channel 125 includes time slot 1 and time slot 2. The two time slots are transmitted alternately. The working channel 125 may therefore support at least two simultaneous calls: one in time slot 1 and a second in time slot 2.

The working channels 125 and 130 include a control frame that contains transfer and verification data that directs the user terminal 105 to transfer from an ongoing call to another call that is a higher priority and transmitted to the same receiving user terminal. For example, when a higher priority call is transmitted by the user terminal 135 to user terminal 105 while a lower priority call is on-going between the user terminal 110 and the user terminal 105, transfer data is placed in the on-going call that directs the user terminal 105 to transfer to the higher priority call transmitted by the user terminal 135. The priority of a call can be indicated at the user terminal. For example, a user terminal can include a switch through which the user can select call priority. The selected priority is assigned to the transmitted call.

The user terminal transfers to the higher priority call by detecting the transfer data within the control frame of the working channel 125 or working channel 130 in the on-going call. The transfer data indicates the working channel 130 and time slot assigned to the higher priority call. The transfer data also includes a color code that identifies the higher priority call within the trunked digital radio communications system. The user terminal transfers to the working channel and time slot included in the transfer data.

The present invention, therefore, allows the receiving user terminal to transfer from the on-going call to the higher priority call. In contrast, user terminals according to the prior art may transfer to the control channel to receive the working channel and time slot assignment of the higher priority call, and thus, possibly increasing the transfer time. As described above, the increased transfer time may increase the possibility that the higher priority call has ended by the time the receiving user terminal completes that transfer. Moreover, according to user terminals of the prior art, if the higher priority call has ended by the time the user terminal transfers to the working channel and time slot assigned to the higher priority call, the receiving user terminal may receive a call that was unintended for the receiving user terminal.

The working channel contains verification data that identifies the current call within the trunked digital radio communications system. The verification data is included within the control frame of the working channel downlink. The verification data and the transfer data are used to verify that the user terminal has transferred to the higher priority call. In particular, the transfer data described above, includes a color code that identifies the higher priority call within the trunked digital radio communications system. The color code included in the verification data is compared to the color code included in the transfer data. If the color codes match, the user terminal transferred to the higher priority call successfully. If, however, the color codes do not match, the user terminal did not transfer to the higher priority call and the user terminal may transfer to the control channel for re-assignment by the trunked digital radio communications system. In other words, the higher priority call may have ended before the transfer to the higher priority call was completed.

Figure 2:
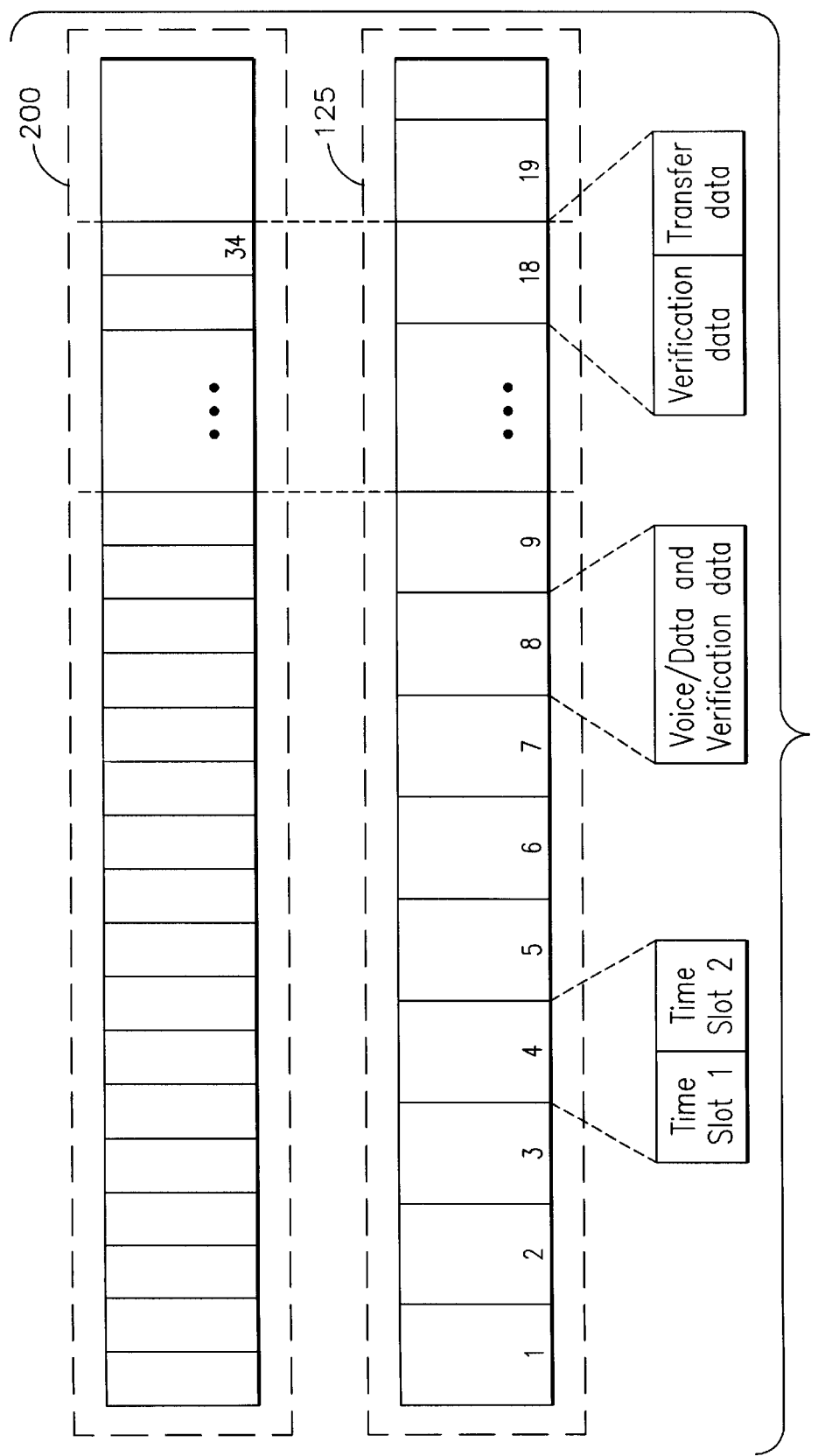
FIG. 2 illustrates a working channel format according to the present invention.

A working channel format will now be described in greater detail. FIG. 2 illustrates a working channel format according to the present invention. Working channel 125 is a TDMA working channel operating at a frequency in the range between about 18 and 19.2 kilo bits per second (kbps). The working channel is divided into 18 frames that include two time slots: time slot 1 and time slot 2. Each time slot is about 56.67 milliseconds (ms) long. Control frame 18 is the eighteenth frame in the working channel and includes the verification and transfer data.

The control frame is monitored by the receiving user terminal during normal operation. For example, the receiving user terminal uses the verification data to determine if the current call being received is the proper call. The transfer data is used to determine if a higher priority call is directed to the receiving user terminal. Furthermore, the transfer data indicates the working channel, time slot, and color code of the higher priority call. The working channel downlink may include additional information, known in the art, to assist in the operation of the user terminal within the trunked digital radio communications system. The control channel 200 may be an EDACS 9600 bps digital GFSK control channel using 30 ms frames.

The control channel 200 may be may be asynchronous with respect to the working channel. Alternately, the control channel 200 may be time-aligned with the working channel every 510 ms so that frame 34 ends at about the same time as the control frame 18 ends. The time-alignment establishes a timing relationship between the control channel and the assigned working channel that may allow the user terminal to locate the proper time slot more quickly than in the prior art. For example, when the user terminal initiates a call, the control channel carries a working channel and time slot assignment for the new call. The user terminal transfers to the assigned working channel and time slot from the control channel.

Figure 3:
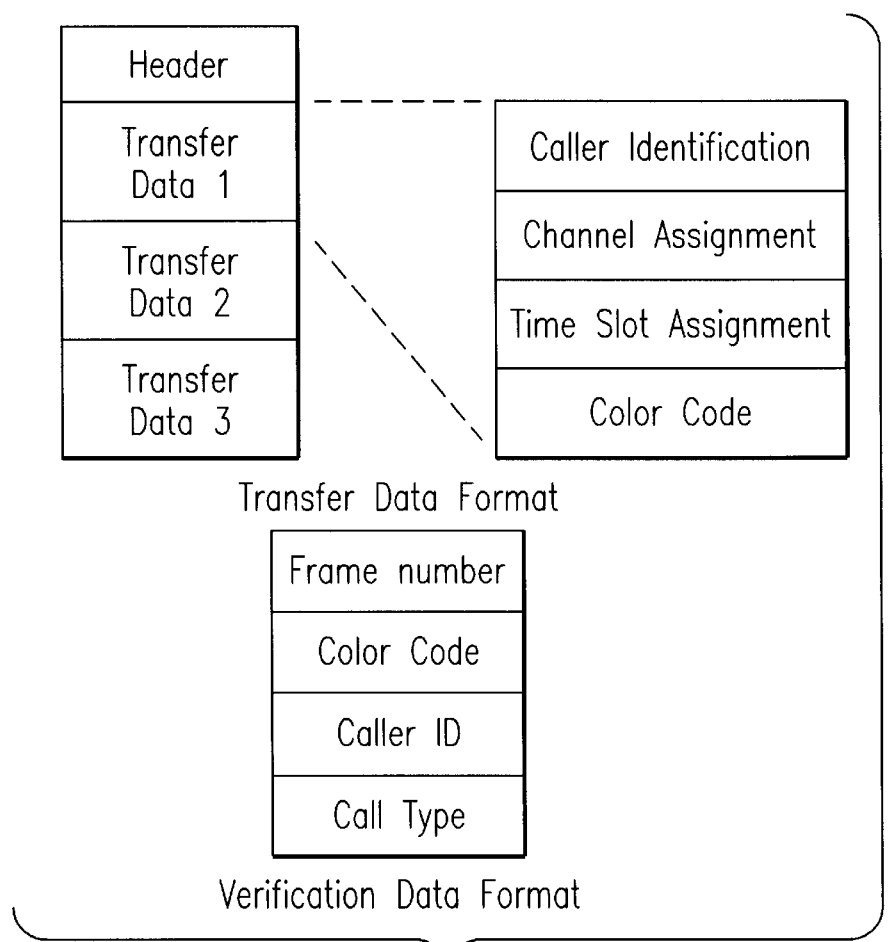
FIG. 3 illustrates a verification and a transfer data format within a working channel downlink control frame according to the present invention.

FIG. 3 illustrates a verification data format and a transfer data format within the working channel downlink control frame according to the present invention. The transfer data fields are identified by a header that indicates that the following data represents transfer data. The transfer data format may allow transfer data for each user terminal and/or group of user terminals to which the call is addressed. Consequently, the addressed user terminals or group of user terminals will transfer to the higher priority call. For example, a higher priority call may be addressed to two individual user terminals and a group of user terminals. The first user terminal may be addressed in the transfer data 1 field. The second user terminal may be addressed in transfer data 2 field and the group of user terminals may be addressed in transfer data 3 field.

The transfer data format includes a caller identification that identifies the receiving user terminal in the trunked digital radio communications system. The receiving user terminal uses the caller identification to determine that the transfer data is addressed to the receiving user terminal. The channel and time slot assignments indicate the working channel downlink and time slot to which the higher priority call has been assigned. The base station assigns the working channel downlink and time slot upon receiving the call from the transmitting user terminal. The receiving user terminal transfers to the higher priority call using the assigned working channel and time slot. The color code identifies the higher priority call within the trunked digital radio communications system. The base station determines the color code upon receiving the call from the transmitting user terminal. The receiving user terminal stores the color code of the higher priority call and compares it to the color code included in the verification data included in the downlink control frame for the current call. The receiving user terminal may thereby ensure that the receiving user terminal transferred to the higher priority call rather than a call that has been assigned the same working channel and time slot included in the transfer data because the higher priority call has ended and the corresponding working channel and time slot has been assigned to a new call.

The verification data identifies the current call within the trunked digital radio communications system and is used, in conjunction with transfer data to ensure that the receiving user terminal has transferred successfully. The verification data includes a frame number that identifies the working channel downlink control frame within the working channel. The color code identifies the call currently being received by the receiving user terminal. The color code included in the verification data is compared to the color code included in the transfer data to ensure that the user terminal transferred to the higher priority call. The call type identifies the current call as encrypted or unencrypted.

Figure 5:
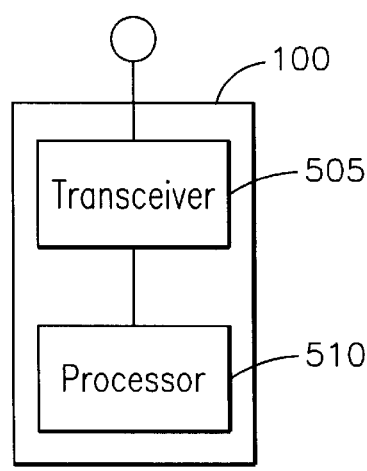
FIG. 5 is a block diagram of a base station according to the present invention.

The base station will now be described in greater detail. FIG. 5 is a block diagram of a base station according to the present invention. The base station 100 relays calls from a first transmitting user terminal to a receiving user terminal on a first working channel.

The base station 100 includes a transceiver 505 that relays a first call from a first transmitting user terminal to a receiving user terminal on a first working channel and receives a second call from a second transmitting user terminal on a second working channel.

The base station 100 includes a processor 510, responsive to the transceiver 505, that places transfer data into the first call from the base station 100 to the receiving user terminal on the first working channel, the transfer data identifying the second call and the second working channel. The processor 510 transmits the transfer data to the receiving user terminal within a control frame on a first working channel downlink, wherein the first working channel downlink links the base station to the receiving user terminal on the first working channel.

The transfer data generated by the processor 510 includes a caller identification that identifies the receiving user terminal, channel and time slot assignments that identify the second working channel downlink and time slot, wherein the second working channel downlink links the base station to the receiving user terminal on the second working channel, and a color code that identifies the second call within the trunked digital radio communications system.

The processor 510 transmits verification data in the current call on working channel downlink that identifies the current call within the trunked digital radio communications system. For example, the processor 510 transmits verification data on a particular working channel that identifies the corresponding call being currently transmitted on the particular working channel.

The verification data includes a frame number that identifies the control frame within the current working channel downlink. The color code identifies the current call within the trunked digital radio communications system and a call type identifier that identifies the current call as an encrypted call or an unencrypted call.

It will be understood that the base station 100 may include a transceiver 505 for each working channel processed by the base station 100. For example, the first working channel 125 and the second working channel 130 may be controlled by separate transceivers 505. Each transceiver 505, therefore, transmits and receives calls to/from the user terminal assigned to the corresponding working channel. For example, a first transceiver 505 transmits calls to the receiving user terminal over the first working channel and a second transceiver 505 transmits calls to the receiving user terminal over the second working channel. Accordingly, when the second call is received at the base station 100 on the second working channel 130, the base station 100 allows communication between the first transceiver 505 and the second transceiver 505, whereby the first transceiver 505 includes the transfer data that identifies the second call on the second working channel 130 into the first call on the first working channel 125.

Figure 4:
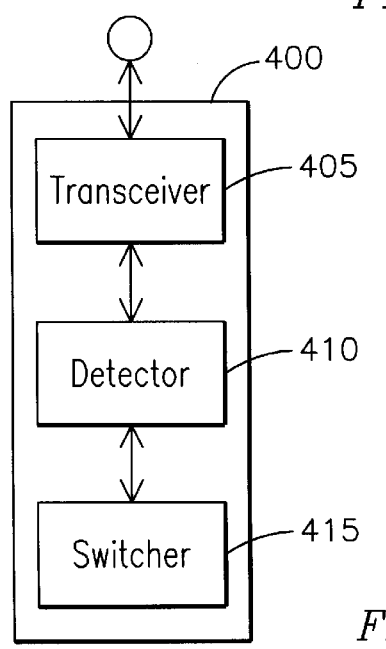
FIG. 4 is a block diagram of a user terminal according to the present invention.

The user terminal will now be described in greater detail. FIG. 4 is a block diagram of a user terminal according to the present invention. The user terminal 400 may be a communications device, such as a radio, which is capable of communicating with the trunked digital radio communications system. The user terminal 400 can alternately be a personal computer, a personal digital assistant, or other electronic device adapted to provide communications with the trunked digital radio communications system. The user terminal 400 communicates with the trunked digital radio communications system wherein the trunked digital radio communications system includes a base station linked to the user terminal by a first working channel and a second working channel. As described above the working channel includes a working channel downlink that links the base station to the receiving user terminal.

The user terminal 400 includes a transceiver 405 that receives calls from the base station on the first and second working channels. A detector 410 is responsive to the transceiver 405 and detects transfer data within a first call on the first working channel. The transfer data is included in the working channel downlink control frame and includes a caller identification that identifies the receiving user terminal to which the call is addressed. The transfer data includes a channel and time slot assignment that identifies the working channel and time slot assigned to a second call made to the receiving user terminal. The transfer data also includes a color code that identifies the second call within trunked digital radio communications system.

The detector 410 examines the transfer data included in the control frame of the first call and determines if the second call is higher priority than the first call. If the second call is higher priority than the first call, the detector 410 stores the color code included in the transfer data that identifies the higher priority second call so that the color code in the transfer data can be compared with the color code included in the verification data included the higher priority second call. The detector 410 stores the color code included in the transfer data so that it may be compared with the color code included with the verification data of the second call.

The color code included in the transfer data is compared to the color code included in the verification data received by the user terminal over the working channel downlink assigned to the higher priority call. If the color codes are not equal, the user terminal 400 has not transferred to the higher priority call. In other words, the current call being received by the user terminal 400 is not the call to which the user terminal was instructed to transfer and the user terminal 400 then transfers to the control channel for re-assignment by the trunked digital radio communications system.

The detector 410 receives verification data during the control frame in the working channel downlink. The verification data includes a frame number that identifies the number of the control flame within the working channel downlink. The color code, as described above, identifies the current call within the trunked digital radio communications system. The call type identifier identifies the current call as encrypted or unencrypted.

A switcher 415 is responsive to the detector 410 and transfers to the second call on the second working channel if the second call is higher priority than the first call. The switcher 415 transfers the user terminal 400 to the higher priority call as described in the transfer data. Specifically, the switcher 415 transfers to the working channel assignment and time slot assignment included in the transfer data if the second call is a higher priority call than the first call. It will be understood that the switcher 415 and detector 410 can be implemented as a computer software program running on a processor.

Figure 6:
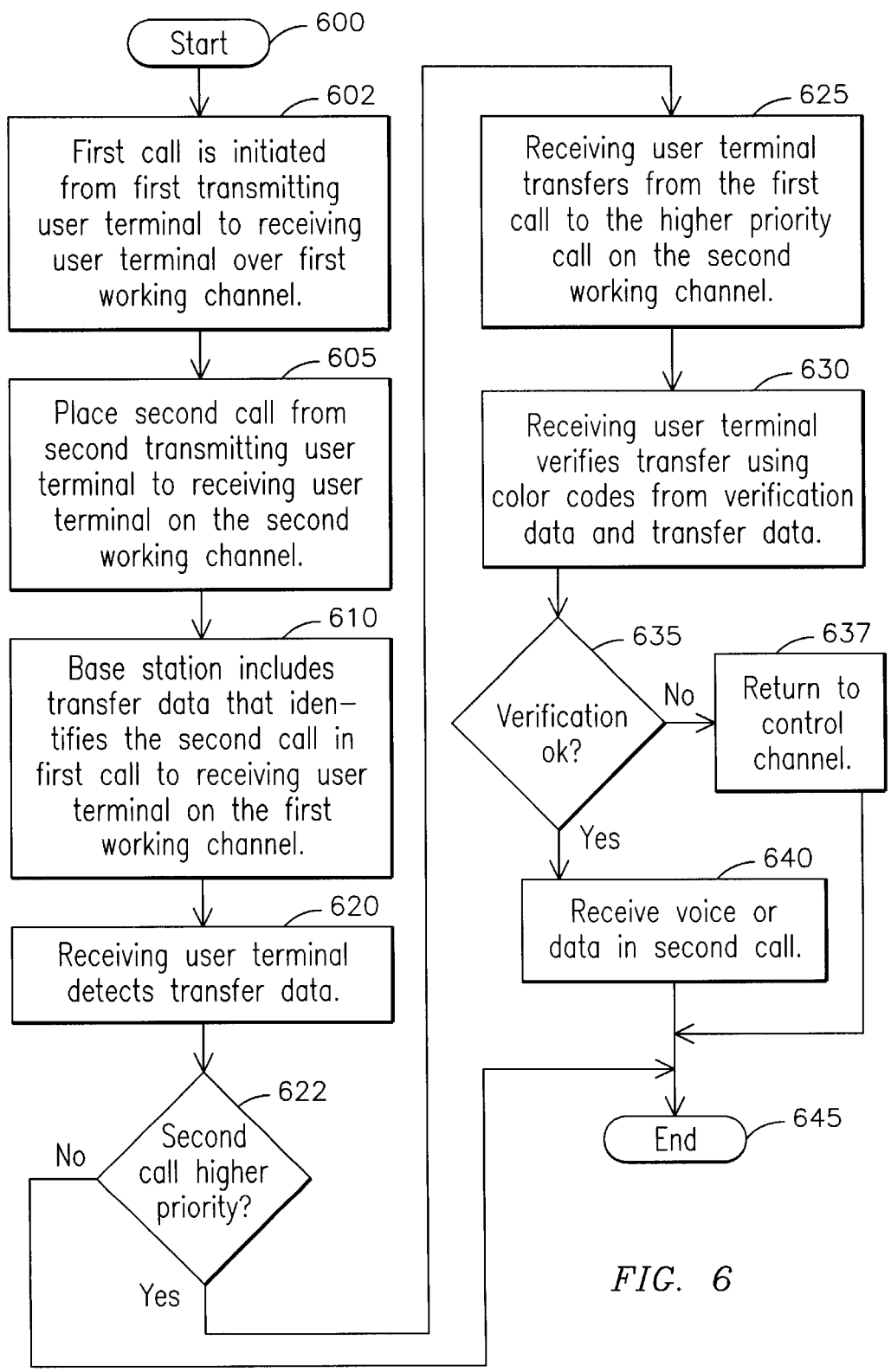
FIG. 6 is a flow chart illustrating operations of a trunked digital radio communications system according to the present invention.

FIG. 6 is a flow chart illustrating operations of a trunked digital radio communications system according to the present invention. Operations begin at block 600. A first call is initiated from the first transmitting user terminal to a receiving user terminal over a first working channel (block 602). A second call is transmitted from a second transmitting user terminal to the receiving user terminal over a second working channel (block 605).

The base station includes transfer data that identifies the second call in the first call to the receiving user terminal (Block 610). The receiving user terminal detects the transfer data in the control frame in the first call (Block 620). If the second call is the same or lower priority as the first call (block 622) operations end (block 645). If however, the second call is higher priority than the first call (block 622). The receiving user terminal transfers from the first call on the first working channel to the second call on the second working channel (block 625). The receiving user terminal verifies the current call on the second working channel using the transfer data transmitted in the first call at block 615 and the verification data in the current call (block 630).

If the color code included in the transfer data is equal to the color code included in the verification data in the current call, the receiving user terminal has successfully transferred to the higher priority call identified in the transfer data (block 635). The receiving user terminal then receives the voice or data included in the higher priority call (block 640) and operations end at block 645.

If, however, the color code included in the transfer data transmission in the first call is not equal to the color code included in the verification data in the current call, the receiving user terminal has transferred to a call which is not the higher priority call identified in the transfer data (block 635). The receiving user terminal then returns to the control channel and operations end at block 645.

The present invention may improve trunked digital radio communications systems by decreasing the transfer time in switching from an on-going call to a higher priority call, and thereby allowing increased probability that the transfer completes before the higher priority call ends. In particular, the present invention transmits transfer data within the on-going call. The transfer data identifies other calls in the trunked digital radio communications system by indicating the working channel and time slot assigned to the other call. The receiving user terminal detects the transfer data, and determines that the other call is higher priority. When the transfer to the higher priority call is complete, the receiving user terminal verifies the accuracy of the transfer by comparing the color code of the current call to the color code of the higher priority call identified in the transfer data.

The present invention may also improve trunked digital radio communications systems by synchronizing the time slots within the working channels, thereby allowing reduced time to transfer from the first call to the second call. For example, the first working channel may include timing information that corresponds to the timing of the assigned time slot in the assigned working channel. The user terminal may therefore determine the start time of the assigned time slot in the second channel and may transfer to the call at the appropriate time. In systems according to the prior art, user terminals may first transfer to the control channel to receive the working channel assignment for the higher priority call. The control channel, however, may not include synchronizing information with respect to the assigned working channel and may therefore increase the time to transfer to the higher priority call. The increased transfer time may increase the possibility that the higher priority call has ended by the time that the user terminal is able to synchronize to the assigned time slot in the assigned working channel.

The present invention may allow user terminals according to the prior art to function in a system utilizing the present invention, thereby allowing backward system compatibility. User terminals in the prior art may use a control channel to receive working channel and time slot assignments for call transfers. The present invention may provide the control channel to the prior art user terminals thereby allowing the prior art user terminals to communicate with user terminals according to the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of transferring from a first call to a second call within a trunked digital radio communications system that includes a first transmitting user terminal that communicates with a receiving user terminal in the first call over a first working channel via a base station, the method comprising the steps of:
   transmitting from a second transmitting user terminal to the base station a second call over a second working channel, that identifies the receiving user terminal;
   transmitting from the base station to the receiving user terminal transfer data in the first call on the first working channel, the transfer data identifying the second call and the second working channel;
   detecting the transfer data in the first call on the first working channel at the receiving user terminal; and
   transferring to the second call on the second working channel at the receiving user terminal based upon the transfer data, wherein the second working channel includes a second working channel downlink that links the base station to the receiving user terminal and wherein a current call is transmitted from the base station to the receiving user terminal on the second working channel downlink; and
   transmitting verification data in the current call on the second working channel downlink that identifies the current call within the trunked digital radio communications system, said step of transmitting verification data comprising:
      transmitting a frame number that identifies a control frame within the second working channel downlink;
      transmitting a data type that identifies the current call as information data or as voice data;
      transmitting a color code that identifies the current call within the trunked digital radio communications system; and
      transmitting a call type identifier that identifies the current call as an encrypted call or an unencrypted call.

2. The method of claim 1, wherein said step of transmitting from the base station to the receiving user terminal transfer data in the first call on the first working channel comprises the steps of:
   detecting the second call from the second transmitting user terminal on the second working channel;
   generating transfer data on the first working channel that identifies the second call; and
   transmitting the transfer data to the receiving user terminal within a control frame on a first working channel downlink that links the base station to the receiving user terminal on the first working channel.

3. The method of claim 2, wherein said step of transmitting the transfer data to the receiving user terminal within a control frame comprises the steps of:
   transmitting a caller identification that identifies the receiving user terminal;
   transmitting a channel assignment that identifies a second working channel downlink that links the base station to the receiving user terminal on the second working channel;
   transmitting a time slot assignment that identifies the time slot within the second working channel downlink in which the second call is transmitted from the base station; and
   transmitting a color code that identifies the second call within the trunked digital radio communications system.

4. The method of claim 1, wherein the first and second working channels are synchronized.

5. The method of claim 1, wherein said step of detecting the transfer data in the first call at the receiving user terminal comprises the steps of:
   detecting a call identifier that identifies the receiving user terminal within the trunked digital radio communications system;
   detecting a channel assignment that identifies a second working channel downlink that links the base station to the receiving user terminal on the second working channel;
   detecting a time slot assignment that identifies a time slot within the second working channel in which the second call is transmitted from the base station; and
   detecting a color code that identifies the second call within the trunked digital radio communications system.

6. The method of claim 1, wherein the second working channel includes a second working channel downlink that links the base station to the receiving user terminal and wherein the transfer data includes a time slot assignment; and wherein said step of transferring to the second call comprises the steps of:
   detecting that the second call from the second transmitting user terminal on the second working channel is a higher priority call than the first call to the receiving user terminal; and
   receiving the second call transmitted by the base station on the second working channel downlink in the assigned time slot.

7. A method of transferring from a first call to a second call within a trunked digital radio communications system that includes a first transmitting user terminal that communicates with a receiving user terminal in the first call over a first working channel via a base station, the method comprising the steps of:
   transmitting from a second transmitting user terminal to the base station a second call over a second working channel, that identifies the receiving user terminal;
   transmitting from the base station to the receiving user terminal transfer data in the first call on the first working channel, the transfer data identifying the second call and the second working channel;
   detecting the transfer data in the first call on the first working channel at the receiving user terminal;
   transferring to the second call on the second working channel at the receiving user terminal based upon the transfer data, wherein the second working channel includes a second working channel downlink that links the base station to the receiving user terminal and wherein a current call is transmitted from the base station to the receiving user terminal on the second working channel downlink;

transmitting verification data in the current call on the second working channel downlink that identifies the current call within the trunked digital radio communications system, wherein the verification data in the current call includes a first color code that identifies the current call within the trunked digital radio communications system and wherein the transfer data in the first call includes a second color code that identifies the second call within the trunked digital radio communications system; and comparing the first color code to the second color code.

8. The method of claim 7, further comprising the step of transferring to a control channel at the receiving user terminal when the first color code and the second color code are different.

9. A user terminal that communicates with a trunked digital radio communications system wherein the trunked digital radio communications system includes a base station linked to the user terminal by a first working channel and a second working channel, the user terminal comprising:

a transceiver that receives calls from the base station on the first and second working channels;

a detector, responsive to said transceiver, that detects transfer data within a first call on the first working channel; and a switcher, responsive to said detector, that switches the transceiver to a second call on the second working channel based on the transfer data, wherein the second working channel includes a second working channel downlink that links the base station to the receiving user terminal and wherein a current call is transmitted from the base station to the receiving user terminal on the second working channel downlink; and wherein said detector further detects verification data in the current call on the second working channel that identifies the current call within the trunked digital radio communications system said verification data comprising:

a frame number that identifies a control frame within the second working channel downlink;

a color code that identifies the current call within the trunked digital radio communications system; and a call type identifier that identifies the current call as an encrypted call or an unencrypted call.

10. The user terminal of claim 9, wherein the transfer data within the first call comprises:

a caller identification that identifies the user terminal;

a channel assignment that identifies a second working channel downlink that links the base station to the user terminal on the second working channel;

a time slot assignment that identifies the time slot within the second working channel downlink in which the second call is transmitted from the base station; and a color code that identifies the second call within the trunked digital radio communications system.

11. The user terminal of claim 10, wherein the detector detects the transfer data within the first call on the first working channel by detecting the call identifier that identifies the user terminal within the trunked digital radio communications system, detecting the channel assignment that identifies the second working channel downlink on which the second call is transmitted to the receiving user terminal, detecting the time slot assignment that identifies the time slot in the second working channel downlink in which the second call is transmitted from the base station to the receiving user terminal, and detecting the color code that identifies the second call in the trunked digital radio communications system.

12. The user terminal of claim 9, wherein the second working channel includes a second working channel downlink that links the base station to the receiving user terminal and wherein the second working channel downlink is identified in the transfer data in the first call and wherein the transfer data includes a time slot assignment; and wherein said switcher receives the second call transmitted by the base station on the second working channel downlink in the assigned time slot.

13. A user terminal that communicates with a trunked digital radio communications system wherein the trunked digital radio communications system includes a base station linked to the user terminal by a first working channel and a second working channel, the user terminal comprising:

a transceiver that receives calls from the base station on the first and second working channels;

a detector, responsive to said transceiver, that detects transfer data within a first call on the first working channel; and a switcher, responsive to said detector, that switches the transceiver to a second call on the second working channel based on the transfer data, wherein the second working channel includes a second working channel downlink that links the base station to the receiving user terminal and wherein a current call is transmitted from the base station to the receiving user terminal on the second working channel downlink; and wherein said detector further detects verification data in the current call on the second working channel that identifies the current call within the trunked digital radio communications system and further wherein a first color code is included in the verification data that identifies the current call within the trunked digital radio communications system and wherein a second color code is included in the transfer data in the second call that identifies the second call within the trunked digital radio communications system; and wherein said detector compares the first color code to the second color code.

14. The user terminal of claim 13, wherein said user terminal transfers to a control channel when the first color code and the second color code are different.

15. A base station within a trunked digital radio communications comprising:

a transceiver that relays a first call from a first transmitting user terminal to a receiving user terminal on a first working channel and receives a second call from a second transmitting user terminal on a second working channel; and a processor, responsive to said transceiver, that places transfer data in the first call from the base station to the receiving user terminal on the first working channel, wherein the transfer data identifies the second call and the second working channel, wherein the second working channel includes a second working channel downlink that links the base station and the receiving user terminal, and wherein a current call is transmitted on the second working channel downlink; and wherein said processor transmits verification data in the current call on the second working channel downlink that identifies the current call within the trunked digital radio communications system, said verification data comprising:
  a frame number that identifies a control frame within the second working channel downlink;
  a color code that identifies the current call within the trunked digital radio communications system; and
  a call type identifier that identifies the current call as an encrypted call or an unencrypted call.

16. The base station of claim 15, wherein the first working channel includes a first working channel downlink that links the base station and the receiving user terminal and wherein the first working channel downlink includes a control frame; and wherein said processor places the transfer data in the first call on the first working channel by detecting the second call from the second transmitting user terminal on the second working channel, generating the transfer data that identifies the second call, and placing the transfer data in the control frame in the first call on the first working channel downlink.

17. The base station of claim 15, wherein the transfer data within the first call comprises:
  a caller identification that identifies the receiving user terminal;
  a channel assignment that identifies a second working channel downlink that links the base station to the receiving user terminal on the second working channel;
  a time slot assignment that identifies the time slot within the second working channel downlink in which the second call is transmitted from the base station; and
  a color code that identifies the second call within the trunked digital radio communications system.

18. A system that transfers from a first call to a second call within a trunked digital radio communications system that includes a first transmitting user terminal that communicates with a receiving user terminal in the first call over a first working channel via a base station, the system comprising:
  means for transmitting from a second transmitting user terminal to the base station a second call over a second working channel, that identifies the receiving user terminal;
  means for transmitting from the base station to the receiving user terminal transfer data in the first call on the first working channel, the transfer data identifying the second call and the second working channel;
  means for detecting the transfer data in the first call on the first working channel at the receiving user terminal; and
  means for transferring to the second call on the second working channel at the receiving user terminal based upon the transfer data, wherein the second working channel includes a second working channel downlink that links the base station to the receiving user terminal and wherein a current call is transmitted from the base station to the receiving user terminal on the second working channel downlink, and wherein the system further comprises means for transmitting verification data in the current call on the second working channel downlink that identifies the current call within the trunked digital radio communications system, said means for transmitting verification data comprising:
  means for transmitting a frame number that identifies a control frame within the second working channel downlink;
  means for transmitting a data type that identifies the current call as information data or as voice data;
  means for transmitting a color code that identifies the current call within the trunked digital radio communications system; and
  means for transmitting a call type identifier that identifies the current call as an encrypted call or an unencrypted call.

19. The system of claim 18, wherein said means for transmitting from the base station to the receiving user terminal transfer data in the first call on the first working channel comprises:
  means for detecting the second call from the second transmitting user terminal on the second working channel;
  means for generating transfer data on the first working channel that identifies the second call; and
  means for transmitting the transfer data to the receiving user terminal within a control frame on a first working channel downlink that links the base station to the receiving user terminal on the first working channel.

20. The system of claim 19, wherein said means for transmitting the transfer data to the receiving user terminal within a control frame comprises:
  means for transmitting a caller identification that identifies the receiving user terminal;
  means for transmitting a channel assignment that identifies a second working channel downlink that links the base station to the receiving user terminal on the second working channel;
  means for transmitting a time slot assignment that identifies the time slot within the second working channel downlink in which the second call is transmitted from the base station; and
  means for transmitting a color code that identifies the second call within the trunked digital radio communications system.

21. The system of claim 18, wherein the first and second working channels are synchronized.

22. The system of claim 18, wherein said means for detecting the transfer data in the first call at the receiving user terminal comprises:
  means for detecting a call identifier that identifies the receiving user terminal within the trunked digital radio communications system;
  means for detecting a channel assignment that identifies a second working channel downlink that links the base station to the receiving user terminal on the second working channel;
  means for detecting a time slot assignment that identifies a time slot within the second working channel in which the second call is transmitted from the base station; and
  means for detecting a color code that identifies the second call within the trunked digital radio communications system.

23. The system of claim 18, wherein the second working channel includes a second working channel downlink that links the base station to the receiving user terminal on the second working channel and wherein the transfer data includes a time slot assignment; and wherein said means for transferring to the second call comprises:
  means for detecting that the second call from the second transmitting user terminal on the second working channel is a higher priority call than the first call to the receiving user terminal;
  means for receiving the second call transmitted by the base station on the second working channel downlink in the assigned time slot.

24. A system that transfers from a first call to a second call within a trunked digital radio communications system that includes a first transmitting user terminal that communicates with a receiving user terminal in the first call over a first working channel via a base station, the system comprising:
- means for transmitting from a second transmitting user terminal to the base station a second call over a second working channel, that identifies the receiving user terminal;
- means for transmitting from the base station to the receiving user terminal transfer data in the first call on the first working channel, the transfer data identifying the second call and the second working channel;
- means for detecting the transfer data in the first call on the first working channel at the receiving user terminal; and
- means for transferring to the second call on the second working channel at the receiving user terminal based upon the transfer data, wherein the second working channel includes a second working channel downlink that links the base station to the receiving user terminal and wherein a current call is transmitted from the base station to the receiving user terminal on the second working channel downlink, and wherein the system further comprises means for transmitting verification data in the current call on the second working channel downlink that identifies the current call within the trunked digital radio communications system, wherein the verification data in the current call includes a first color code that identifies the current call in the trunked digital radio communications system and wherein the transfer data in the first call includes a second color code that identifies the second call in the trunked digital radio communications system; and wherein the system further comprises means for comparing the first color code to the second color code.

25. The system of claim 24, further comprising means for transferring to a control channel at the receiving user terminal when the first color code and the second color code are different.

* * * * *